(12) United States Patent
Kubo et al.

(10) Patent No.: US 9,013,763 B2
(45) Date of Patent: Apr. 21, 2015

(54) IMAGE READING APPARATUS AND IMAGE FORMING APPARATUS

(71) Applicants: Hiroshi Kubo, Kanagawa (JP);
Hidehiko Fujiwara, Tokyo (JP);
Atsushi Kanaya, Kanagawa (JP);
Shinya Kitaoka, Kanagawa (JP);
Takeshi Akai, Kanagawa (JP);
Fumiyuki Heishi, Kanagawa (JP);
Takehisa Shimazu, Kanagawa (JP);
Koki Sakano, Kanagawa (JP); Takuya Sano, Kanagawa (JP)

(72) Inventors: Hiroshi Kubo, Kanagawa (JP);
Hidehiko Fujiwara, Tokyo (JP);
Atsushi Kanaya, Kanagawa (JP);
Shinya Kitaoka, Kanagawa (JP);
Takeshi Akai, Kanagawa (JP);
Fumiyuki Heishi, Kanagawa (JP);
Takehisa Shimazu, Kanagawa (JP);
Koki Sakano, Kanagawa (JP); Takuya Sano, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/134,510

(22) Filed: Dec. 19, 2013

(65) Prior Publication Data
US 2014/0177012 A1 Jun. 26, 2014

(30) Foreign Application Priority Data

Dec. 25, 2012 (JP) .................................. 2012-281361
Sep. 24, 2013 (JP) .................................. 2013-197001

(51) Int. Cl.
*H04N 1/04* (2006.01)
*H04N 1/12* (2006.01)
*H04N 1/193* (2006.01)

(52) U.S. Cl.
CPC ............. *H04N 1/123* (2013.01); *H04N 1/1235* (2013.01); *H04N 1/0464* (2013.01); *H04N 1/193* (2013.01); *H04N 2201/0081* (2013.01); *H04N 2201/0456* (2013.01)

(58) Field of Classification Search
CPC . H04N 1/00602; H04N 1/121; H04N 1/0058; H04N 1/1235; H04N 1/00591; H04N 2201/044; H04N 1/0057; H04N 1/00572; H04N 1/123; H04N 1/4097; H04N 1/00615; H04N 2201/04755
USPC ......... 358/498, 474, 496, 497, 486, 488, 448, 358/461, 494, 506; 399/367
See application file for complete search history.

(56) References Cited

U.S. PATENT DOCUMENTS 4,172,531 A * 10/1979 Muller ........................ 414/798.7
4,849,788 A * 7/1989 Prebola ......................... 399/372
4,958,198 A * 9/1990 Hamakawa ................... 399/364

(Continued)

FOREIGN PATENT DOCUMENTS

JP  63-303561    12/1988
JP  2004-260246  9/2004

(Continued)

*Primary Examiner* — Negussie Worku
(74) *Attorney, Agent, or Firm* — Harness, Dickey & Pierce, P.L.C.

(57) ABSTRACT

An image reading apparatus includes: a transmitting glass; and a step member that is located upstream of a reading position, at which an image of a conveyed document is read by a reading unit via a transmitting glass, in a conveying direction of the document, and has a document guiding surface at a position away from a surface of a transmitting glass by a prescribed distance and forms a step between the document guiding surface and the transmitting glass. The step member is provided with a protrusion protruding downstream in the conveying direction of the document to form space between the transmitting glass and a downstream part of the step member in the conveying direction of the document.

13 Claims, 9 Drawing Sheets

(56) References Cited

U.S. PATENT DOCUMENTS

| | | | |
|---|---|---|---|
| 5,058,877 A | 10/1991 | Fujiwara et al. | |
| 5,559,594 A * | 9/1996 | Ohhata et al. | 399/372 |
| 5,638,181 A | 6/1997 | Kubo et al. | |
| 5,713,279 A * | 2/1998 | Iida et al. | 101/128.4 |
| 5,734,483 A * | 3/1998 | Itoh | 358/496 |
| 5,969,826 A * | 10/1999 | Dash et al. | 358/400 |
| 5,971,388 A | 10/1999 | Hattori et al. | |
| 5,992,841 A * | 11/1999 | Fujii et al. | 271/3.02 |
| 6,219,507 B1 * | 4/2001 | Yoneda et al. | 399/110 |
| 6,268,909 B1 * | 7/2001 | Honmochi et al. | 355/407 |
| 6,641,132 B2 * | 11/2003 | Sekine | 271/124 |
| 7,149,005 B2 * | 12/2006 | Chung | 358/474 |
| 7,306,218 B2 * | 12/2007 | Kobayashi | 271/186 |
| 8,072,655 B2 * | 12/2011 | Park et al. | 358/474 |
| 8,355,080 B2 * | 1/2013 | Park et al. | 348/498 |
| 2004/0004319 A1 | 1/2004 | Hattori et al. | |
| 2004/0227981 A1 | 11/2004 | Nishikawa et al. | |
| 2005/0179963 A1 | 8/2005 | Nagano et al. | |
| 2007/0264063 A1 | 11/2007 | Sano et al. | |
| 2008/0179809 A1 | 7/2008 | Kikkawa et al. | |
| 2008/0308995 A1 | 12/2008 | Tobinaga et al. | |
| 2010/0027081 A1 | 2/2010 | Sano et al. | |
| 2010/0072692 A1 | 3/2010 | Iida et al. | |
| 2010/0225045 A1 | 9/2010 | Kimura et al. | |
| 2010/0225053 A1 | 9/2010 | Nakamura et al. | |
| 2010/0225983 A1 | 9/2010 | Fujii et al. | |
| 2011/0304092 A1 | 12/2011 | Kambayashi et al. | |
| 2012/0002252 A1 | 1/2012 | Kubo et al. | |
| 2012/0057212 A1 | 3/2012 | Tobinaga et al. | |
| 2012/0119432 A1 | 5/2012 | Kambayashi et al. | |
| 2012/0119436 A1 | 5/2012 | Morita et al. | |
| 2012/0314267 A1 | 12/2012 | Suzuki et al. | |
| 2013/0175755 A1 | 7/2013 | Machida et al. | |
| 2013/0215481 A1 | 8/2013 | Hayasaka et al. | |
| 2013/0242359 A1 | 9/2013 | Heishi et al. | |
| 2013/0315610 A1 | 11/2013 | Utagawa et al. | |

FOREIGN PATENT DOCUMENTS

| | | |
|---|---|---|
| JP | 2005-260548 | 9/2005 |
| JP | 2010-193004 | 9/2010 |
| JP | 4618157 | 11/2010 |

* cited by examiner

IMAGE READING APPARATUS AND IMAGE FORMING APPARATUS

CROSS-REFERENCE TO RELATED APPLICATIONS

The present application claims priority to and incorporates by reference the entire contents of Japanese Patent Application No. 2012-281361 filed in Japan on Dec. 25, 2012 and Japanese Patent Application No. 2013-197001 filed in Japan on Sep. 24, 2013.

BACKGROUND OF THE INVENTION

1. Field of the Invention

The present invention relates to an image reading apparatus and an image forming apparatus.

2. Description of the Related Art

In a known image reading apparatus called a sheet-through type, a document is conveyed in a sub-scanning direction and caused to pass through a fixed reading position to perform the sub-scanning of an image of the document. At the reading position of an image reading unit, a transmitting glass is provided to allow the transmission of light emitted from a light source inside the image reading unit to the outside document and light reflected at the image surface of the document and traveling to the inside of the image reading unit.

If the image reading apparatus of this type is configured such that the document passes through the transmitting glass while coming in contact with the same at reading an image of the document, there is a likelihood that glue, correction fluid, or the like attached to the document is transferred onto the transmitting glass. The transfer of foreign matter such as glue onto the transmitting glass as described above gives an influence on a read image signal as vertical streaks, which results in the degradation of the read image.

Japanese Patent No. 4618157 describes an image reading apparatus in which a sheet member serving as a step member is adhered to the upper surface of a transmitting glass on an upstream side in the conveying direction of a document to provide the step between the transmitting glass and a sheet-member surface serving as a document guiding surface and the document is conveyed with a prescribed distance from the transmitting glass at a reading position.

In addition, Japanese Patent Application Laid-open No. 2004-260246 describes an image reading apparatus in which the end of a sheet member on a downstream side in the conveying direction of a document is made into an inclined surface that gradually gets closer to a transmitting glass toward the downstream side.

If the document is conveyed with a prescribed distance from the transmitting glass as in the image reading apparatus described in Japanese Patent No. 4618157, foreign matter such as glue can be prevented from being transferred onto the transmitting glass at the reading position and the degradation of a read image can be prevented.

In the image reading apparatus described in Japanese Patent No. 4618157, however, the trailing end of the document forcefully moves to the side of the transmitting glass due to the stiffness of the document, i.e., due to the rigidity of the document or the like when passing through the end of the sheet member serving as the step on the downstream side in the conveying direction of the document and then contacts the transmitting glass. As a result, the distance between the document and the reading apparatus suddenly reduces at the reading position. When the distance between the document and the reading apparatus reduces, an image of the document is read in a greater size. This results in a problem in which the size of the image suddenly increases at a certain point of the trailing end of the read image. Particularly, the thickness of a vertical line extending in a sub-scanning direction suddenly increases at a certain point of the trailing end, which makes the degradation of the image conspicuous.

If the end of the sheet member on the downstream side in the conveying direction of the document is made into the inclined surface as in the image reading apparatus described in Japanese Patent Application Laid-open No. 2004-260246, the trailing end of the document can gradually move closer to the transmitting glass as being guided by the inclined surface. Thus, since the size of a read image at the trailing end thereof gradually increases, the degradation of the image can be made inconspicuous compared with a case in which the size of the image suddenly increases.

However, the step (thickness of the sheet member) is about 0.5 mm, and thus it is difficult to form the inclination described above. In addition, FIG. 5 in Japanese Patent Application Laid-open No. 2004-260246 illustrates a configuration in which a plurality of sheet members is superimposed one on another to form steps at the end of a step member on the downstream side in the conveying direction of the document. However, if the sheet members are thick, the document falls from a high position correspondingly. Therefore, the problem in which the size of an image is suddenly changed cannot be substantially prevented. In view of this, it may also be possible that thin sheet members are superimposed one on another to lower the steps of the step-like portion at the end thereof on the downstream side in the conveying direction of the document. In this case, however, the plurality of thin sheet members is required to be bonded together in their deviated state, which gives rise to a problem that a manufacturing cost increases.

Moreover, it may be possible that the step member is made of an elastic member and the step member on the downstream side in the conveying direction of the document is compressed and elastically deformed by the stiffness of the document to prevent the document from falling from a high position. However, according to a configuration in which the step member on the downstream side in the conveying direction of the document is brought into contact with the transmitting glass and compressed and deformed by the stiffness of the document, there is a limit in the compressive deformation. Therefore, the document-falling problem cannot be substantially prevented.

In view of the above, there is a need to provide an image reading apparatus and an image forming apparatus capable of making a change in the size of a read image at the trailing end thereof inconspicuous with a simple configuration.

SUMMARY OF THE INVENTION

It is an object of the present invention to at least partially solve the problems in the conventional technology.

An image reading apparatus includes: a transmitting glass; and a step member that is located upstream of a reading position, at which an image of a conveyed document is read by a reading unit via a transmitting glass, in a conveying direction of the document, and has a document guiding surface at a position away from a surface of a transmitting glass by a prescribed distance and forms a step between the document guiding surface and the transmitting glass. The step member is provided with a protrusion protruding downstream in the conveying direction of the document to form space between the transmitting glass and a downstream part of the step member in the conveying direction of the document.

An image forming apparatus includes: an image forming unit that forms an image on a recording member; and an image reading unit that reads an image of a document while conveying the document. The image forming apparatus forms an image read by the image reading unit on the recording member by the image forming unit. The image reading apparatus includes: a transmitting glass; and a step member that is located upstream of a reading position, at which an image of a conveyed document is read by a reading unit via a transmitting glass, in a conveying direction of the document, and has a document guiding surface at a position away from a surface of a transmitting glass by a prescribed distance and forms a step between the document guiding surface and the transmitting glass. The step member is provided with a protrusion protruding downstream in the conveying direction of the document to form space between the transmitting glass and a downstream part of the step member in the conveying direction of the document.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a description will be given of an embodiment in which the present invention is applied to an electrophotographic copier (hereinafter simply referred to as a copier).

Figure 1:
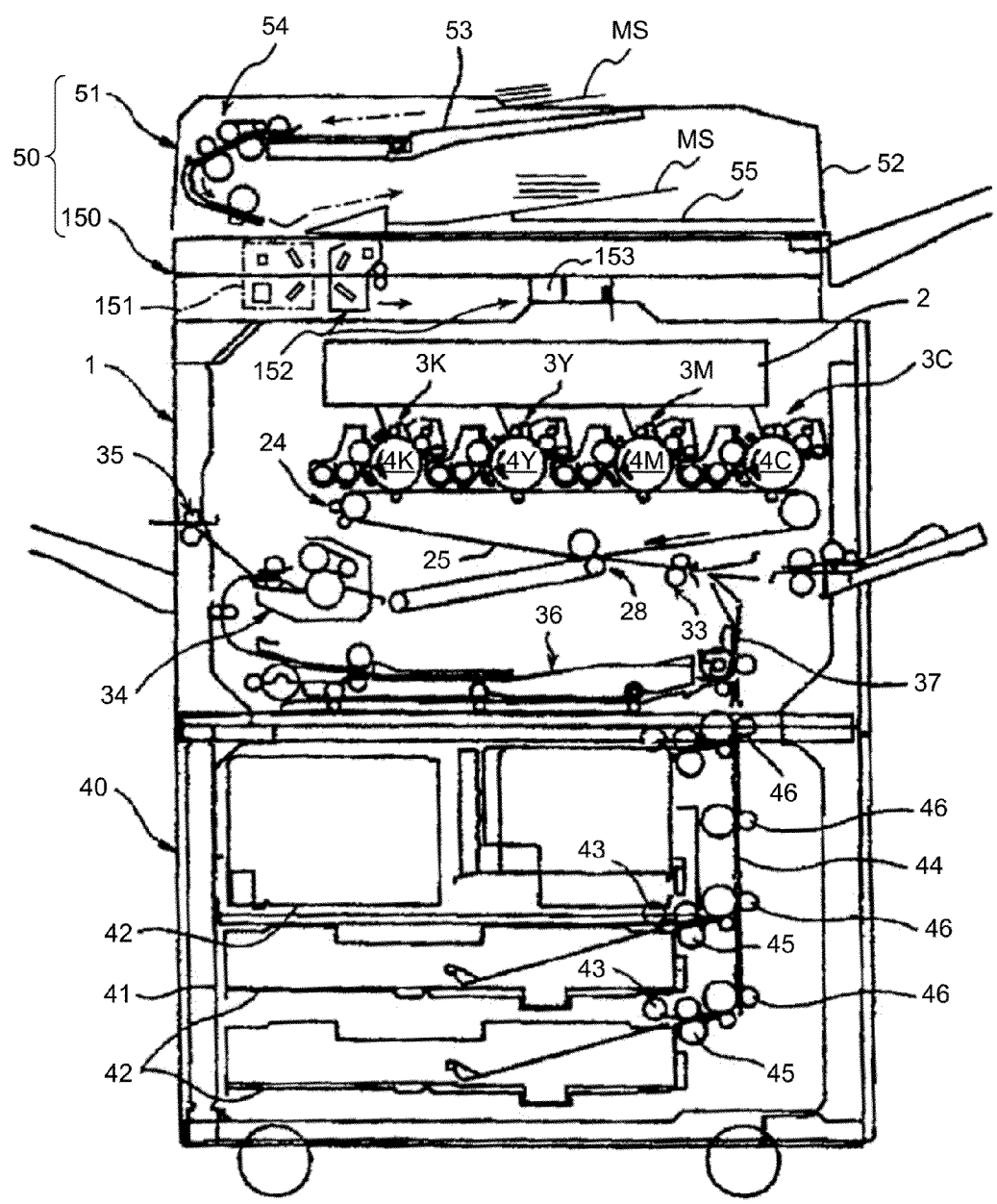
FIG. 1 is a schematic configuration view illustrating a copier according an embodiment.

First, the basic configuration of the copier according to the embodiment will be described. FIG. 1 is a schematic configuration view illustrating the copier according to the embodiment. The copier includes an image forming unit 1, a white paper supplying apparatus 40, and a document reading apparatus 50. The document reading apparatus 50 includes a scanner 150 fixed onto the image forming unit 1 and an ADF 51 serving as a document conveying apparatus supported by the scanner 150.

The white paper supplying apparatus 40 includes two paper feeding cassettes 42 disposed inside a paper bank 41 in a multistage fashion, delivering rollers 43 that deliver transfer papers from the paper feeding cassettes, separating rollers 45 that separate the delivered transfer papers and supply the same to a paper feeding path 44, and the like. In addition, a plurality of conveying rollers 47 that conveys the transfer papers to a paper feeding path 37 inside the image forming unit 1, and the like are provided. Thus, the transfer papers inside the paper feeding cassettes is fed to the paper feeding path 37 inside the image forming unit 1.

Figure 2:
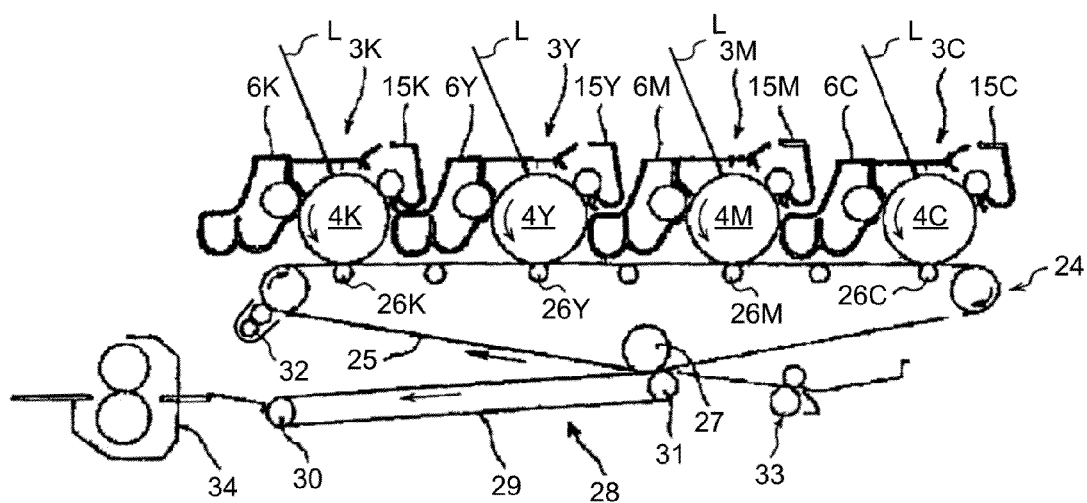
FIG. 2 is a partially-enlarged configuration view illustrating a part of the internal configuration of the image forming unit of the copier in an enlarged fashion.

FIG. 2 is a partially-enlarged configuration view illustrating a part of the internal configuration of the image forming unit in an enlarged fashion. The image forming unit 1 serving as an image forming unit includes an optical writing device 2, four process units 3K, 3Y, 3M, and 3C that form toner images in the colors of K, Y, M, and C, and a transfer unit 24. In addition, a paper conveying unit 28, a pair of registration rollers 33, a fixing device 34, a switch back device 36, the paper feeding path 37, and the like are provided. A light source such as a laser diode and an LED (not illustrated) disposed inside the optical writing device 2 is driven to irradiate laser light L onto four drum-like photosensitive bodies 4K, 4Y, 4M, and 4C. By the irradiation, electrostatic latent images are formed on the surfaces of the photosensitive bodies 4K, 4Y, 4M, and 4C. Then, the latent images are developed into toner images by way of a prescribed developing process. Note that the subscripts K, Y, M, and C added after the reference symbols represent specifications for the colors of black, yellow, magenta, and cyan, respectively.

Each of the process units 3K, 3Y, 3M, and 3C is supported on a common supporting body as a unit composed of the corresponding photosensitive body and various devices disposed around the photosensitive body, and is detachable from the main body of the image forming unit 1. For example, the process unit 3K for black includes, besides the photosensitive body 4K, a developing device 6K that develops an electrostatic latent image formed on the surface thereof into a black toner image. In addition, a drum cleaning device 15 that cleans transfer remaining toner attached to the surface of the photosensitive body 4K having passed through a primary transfer nip for black that will be described later, and the like are provided. The copier has so-called a tandem configuration in which the four process units 3K, 3Y, 3M, and 3C are disposed so as to be side by side along the endless movement direction of an intermediate transfer belt 25 that will be described later.

Figure 3:
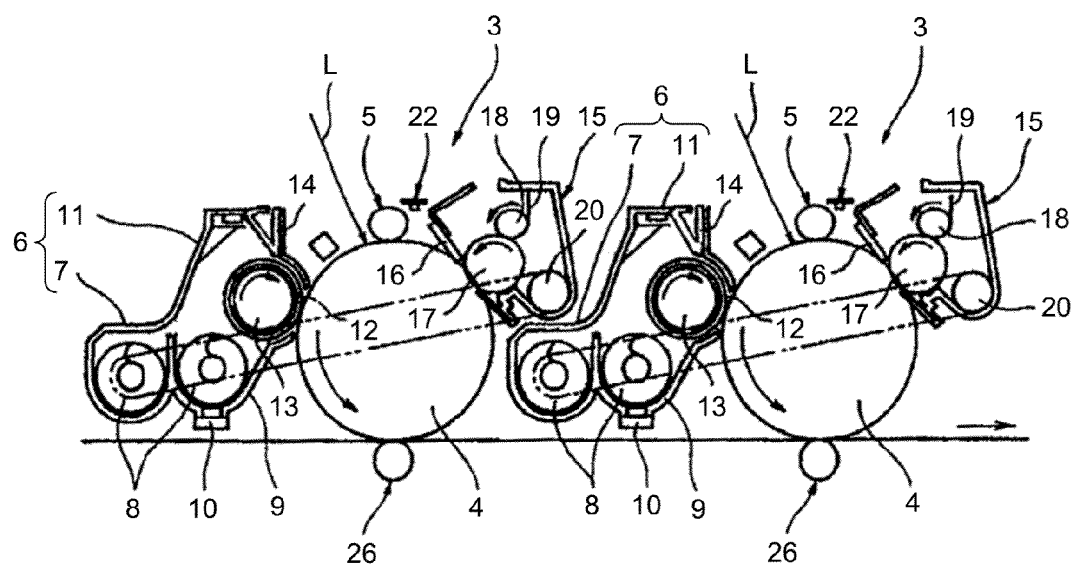
FIG. 3 is a partially-enlarged view illustrating a part of a tandem part composed of four process units in the image forming unit.

FIG. 3 is a partially-enlarged view illustrating a part of a tandem part composed of the four process units 3K, 3Y, 3M, and 3C. Note that since the four process units 3K, 3Y, 3M, and 3C have nearly the same configuration except for the toner colors used thereby, the subscripts K, Y, M, and C added to the respective reference symbols are omitted in FIG. 3. As illustrated in FIG. 3, each of the process units 3 includes a charging device 23, the developing device 6, the drum cleaning device 15, and an electricity eliminating lamp 22, and the like around the photosensitive body 4.

The photosensitive body 4 is of a drum type with a photosensitive layer having an organic photosensitive material with photosensitivity coated on an original pipe thereof made of aluminum or the like. However, an endless belt type may be used instead.

The developing device 6 develops a latent image using a two-component developer containing a magnetic carrier and non-magnetic toner (not illustrated). An agitating section 7 that supplies the two-component developer stored therein to a developing sleeve 12 while agitating and conveying the same, and a developing section 11 that transfers toner in the two-component developer carried on the developing sleeve 12 to the photosensitive body 4 are provided.

The agitating section 7 includes two conveying screws 8 provided lower in position than the developing section 11 and disposed parallel to each other, a partitioning plate provided between the conveying screws 8, a toner concentration sensor 10 provided at the bottom surface of a developing case 9, and the like.

The developing section 11 includes the developing sleeve 12 opposed to the photosensitive body 4 via the opening of the developing case 9, a magnet roller 13 provided inside the developing sleeve 12 so as not to be rotatable, a doctor blade 14 having the tip thereof get closer to the developing sleeve 12, and the like. The developing sleeve 12 is a non-magnetic and rotatable cylinder. The magnet roller 13 includes a plurality of magnetic poles successively arranged from a position at which the magnet roller 13 is opposed to the doctor blade 14 toward the rotating direction of the developing sleeve 12. Each of the magnetic poles applies a magnetic force to the two-component developer on the developing sleeve 12 at a prescribed position in the rotating direction. Thus, the two-component developer conveyed from the agitating section 7 is attracted to and carried on the surface of the developing sleeve 12 and a magnetic brush is formed on the surface of the developing sleeve 12 along a magnetic line.

After being controlled by the rotation of the developing sleeve 12 to have an appropriate layer thickness when passing through a position at which the magnetic brush is opposed to the doctor blade 14, the magnetic brush is conveyed to a developing region opposed to the photosensitive body 4. Then, toner is transferred onto an electrostatic latent image by the potential difference between a developing bias applied to the developing sleeve 12 and the electrostatic latent image on the photosensitive body 4 to contribute to development. Moreover, the toner is returned into the developing section 11 again by the rotation of the developing sleeve 12 and then returned into the agitating section 7 after being separated from the surface of the developing sleeve by the influence of the repulsive magnetic field formed between the magnetic poles of the magnet roller 13. Inside the agitating section 7, the two-component developer is replenished with an appropriate amount of toner based on a detection result by the toner concentration sensor 10. Note that the developing device 6 may be of a type that uses a one-component developer not containing a magnetic carrier instead of the two-component developer.

The drum cleaning device 15 is of a type having a cleaning blade 16 made of polyurethane rubber and pressed onto the photosensitive body 4, but may be of another type. In this example, for the purpose of enhancing cleaning performance, a type having a contact-conductivity fur brush 17 the peripheral surface of which contacts the photosensitive body 4 and that is rotatable in a direction as indicated by an arrow in FIG. 3 is employed. The fur brush 17 also plays a role in scraping a lubricant from a solid lubricant (not illustrated) to form fine particles and coating the resulting fine particles onto the surface of the photosensitive body 4. A metal electric field roller 18 that applies a bias to the fur brush 17 is provided so as to be rotatable in a direction as indicated by an arrow in FIG. 3, and the tip of a scraper 19 is pressed onto the electric field roller 18. Toner attached to the fur brush 17 is transferred onto the electric field roller 18 that rotates in contact with the fur brush 17 counterclockwise to have a bias applied thereto. After being scraped from the electric field roller 18 by the scraper 19, the toner falls on a collecting screw 20. The collecting screw 20 conveys the collected toner toward the end of the drum cleaning device 15 in a direction orthogonal to the space of FIG. 3 and passes the same to an external recycle conveying device 21. The recycle conveying device 21 supplies the received toner to the developing device 6 for recycling.

The electricity eliminating lamp 22 eliminates electricity from the photosensitive body 4 by the irradiation of light. After being uniformly charged by the charging device 23, the surface of the photosensitive body 4 from which electricity has been eliminated is subjected to an optical writing process by the optical writing device 2. Note that the charging device 23 is of a type that rotates a charging roller to which a charge bias is applied while causing the same to come in contact with the photosensitive body 4. Instead, a scorotron charger that applies a charging process to the photosensitive body 4 in a non-contact fashion or the like may be used.

In FIG. 2, toner images in the colors of K, Y, M, and C are formed by the process described above on the photosensitive bodies 4K, 4Y, 4M, and 4C of the four process units 3K, 3Y, 3M, and 3C.

The transfer unit 24 is disposed beneath the four process units 3K, 3Y, 3M, and 3C. The transfer unit 24 causes the intermediate transfer belt 25 stretched by a plurality of rollers to endlessly move clockwise in FIG. 2 while causing the same to come in contact with the photosensitive bodies 4K, 4Y, 4M, and 4C. Thus, primary transfer nips for K, Y, M, and C are formed at which the photosensitive bodies 4K, 4Y, 4M, and 4C and the intermediate transfer belt 25 come in contact with each other. In the vicinity of the primary transfer nips for K, Y, M, and C, primary transfer rollers 26K, 26Y, 26M, and 26C disposed inside a belt loop press the intermediate transfer belt 25 toward the photosensitive bodies 4K, 4Y, 4M, and 4C. A primary transfer bias is applied to each of the primary transfer rollers 26K, 26Y, 26M, and 26C by a power supply (not illustrated). Thus, primary transfer electric fields for electrostatically moving toner images on the photosensitive bodies 4K, 4Y, 4M, and 4C toward the intermediate transfer belt 25 are formed at the primary transfer nips for K, Y, M, and C. As the intermediate transfer belt 25 endlessly moves clockwise in FIG. 2 and successively passes through the primary transfer nips for K, Y, M, and C, the toner images are successively superimposed and primarily transferred onto the front surface of the intermediate transfer belt 25 at the respective primary transfer nips. By the primary transfer of the toner images in a superimposed fashion, a four-color superimposed toner image (hereinafter referred to as a four-color toner image) is formed on the front surface of the intermediate transfer belt 25.

In FIG. 2, beneath the transfer unit 24, the paper conveying unit 28 is provided in which an endless paper conveying belt 29 is laid between a driving roller 30 and a secondary transfer roller 31 and caused to endlessly move. Further, the intermediate transfer belt 25 and the paper conveying belt 29 are held between the secondary transfer roller 31 and a lower stretching roller 27 of the transfer unit 24. Thus, a secondary transfer nip is formed at which the front surface of the intermediate transfer belt 25 and the front surface of the paper conveying belt 29 come in contact with each other. A secondary transfer bias is applied to the secondary transfer roller 31 by a power supply (not illustrated). On the other hand, the lower stretching roller 27 of the transfer unit 24 is grounded. Thus, a secondary transfer electric field is formed at the secondary transfer nip.

In FIG. 2, the pair of registration rollers 33 is disposed to the right of the secondary transfer nip, and a transfer paper held the registration rollers 33 is delivered to the secondary transfer nip at a timing at which the transfer paper can be synchronized with a four-color toner image on the intermediate transfer belt 25. Inside the secondary transfer nip, the four-color toner image on the intermediate transfer belt 25 is secondarily transferred onto the transfer paper in a lump by the influence of the secondary transfer electric field and nip pressure and made into a full-color image in combination with the white color of the transfer paper. The transfer paper having passed through the secondary transfer nip is separated from the intermediate transfer belt 25 and conveyed to the fixing device 34 by the endless movement of the paper conveying belt 29 while being held on the front surface of the paper conveying belt 29.

Transfer remaining toner that has not been transferred onto the transfer paper at the secondary transfer nip is attached to the surface of the intermediate transfer belt 25 having passed through the secondary transfer nip. The transfer remaining toner is scraped and removed by a belt cleaning device that comes in contact with the intermediate transfer belt 25.

After the full-color image is pressed and heated by the fixing device 34 so as to be fixed, the transfer paper having been conveyed to the fixing device 34 is delivered from the fixing device 34 to a pair of paper ejecting rollers 35 and ejected to the outside of the apparatus.

In FIG. 1, the switch back device 36 is disposed under the paper conveying unit 28 and the fixing device 34. Thus, the transfer paper having one surface thereof subjected to the image fixing process is switched to move toward a transfer paper inverting device by a switching claw. The transfer paper is inverted by the transfer paper inverting device and goes into the secondary transfer nip again. After having the other surface thereof subjected to the secondary transfer process and the fixing process of an image, the transfer paper is ejected onto a paper catching tray.

The scanner 150 fixed onto the image forming unit 1 includes a fixed first-surface reading unit 151 serving as a first-surface reading unit and a moving and reading unit 152 serving as the first-surface reading unit.

The moving and reading unit 152 serving as the first-surface reading unit is disposed right under a second contact glass (not illustrated) fixed onto the upper wall of the case of the scanner 150 so as to contact a document MS, and can horizontally move an optical system composed of a light source, reflection mirrors, and the like in FIG. 1. Further, in the process of horizontally moving the optical system in FIG. 1, light from the light source is reflected at a document (not illustrated) placed on the second contact glass and received by an image reading sensor 153 fixed to the main body of the scanner via the plurality of reflection mirrors.

The fixed first-surface reading unit 151 serving as the first-surface reading unit is disposed right under a first contact glass (not illustrated) fixed onto the upper wall of the case of the scanner 150 so as to contact the document MS. Further, when the document MS conveyed by the ADF 51 that will be described later passes through the first contact glass, the light from the light source is successively reflected at the surface of the document and received by the image reading sensor via the plurality of reflection mirrors. Thus, a first surface of the document MS is scanned without moving the optical system composed of the light source, the reflection mirrors, and the like.

In addition, the scanner 150 includes a contact type image sensor that reads a second surface of the document MS. The contact type image sensor will be described later.

Figure 4:
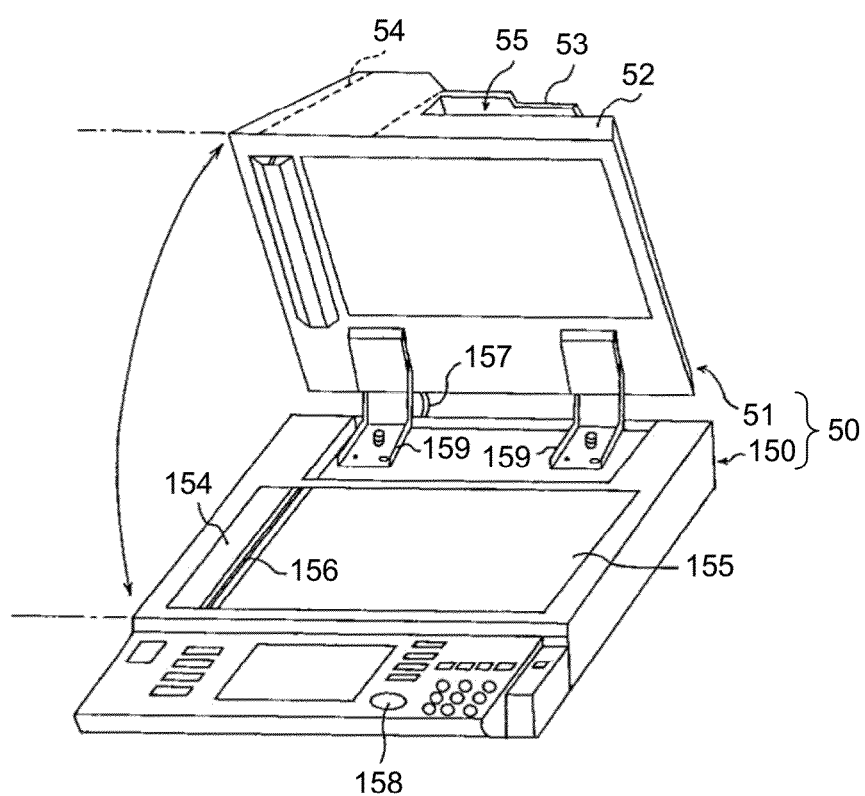
FIG. 4 is a perspective view illustrating the scanner and the ADF of the copier.

The ADF 51 disposed on the scanner 150 retains on a main body cover 52, a document setting board 53 on which the document MS to be read is placed, a conveying unit 54 that conveys the document MS, a document stacking board 55 on which the document MS having been read is stacked, and the like. As illustrated in FIG. 4, the ADF 51 is supported by hinges 159 fixed to the scanner 150 so as to be vertically swingable. Further, the ADF 51 moves like an opening/closing door by its swinging operation and exposes the first contact glass 154 and the second contact glass 155 on the upper surface of the scanner 150 in its opened state. A one-side-stitched document such as a book, in which a corner of a bundle of documents is stitched, cannot be conveyed by the ADF 51 since the documents cannot be separated one by one. In this case, after the ADF 51 is opened as illustrated in FIG. 4, the one-side-stitched document with the page to be desirably read opened is directed downward and placed on the second contact glass 155. After the document is placed on the second contact glass 155, the ADF 51 is closed. Then, an image of the page is read by the moving and reading unit 152 of the scanner 150 illustrated in FIG. 1.

On the other hand, in the case of a bundle of documents in which a plurality of mutually-independent documents MS is simply superimposed one on another, the documents MS can be successively read by the fixed first-surface reading unit 151 inside the scanner 150 and the contact type image sensor inside the ADF 51 while being automatically conveyed one by one by the ADF 51. In this case, after the bundle of documents is set on the document setting board 53, a copy starting button (not illustrated) is pressed. Then, the ADF 51 successively delivers the bundle of documents MS placed on the document setting board 53 into the conveying unit 54 from the top, and conveys the same toward the document stacking board 55 in their inverted state. In the process of the conveyance, the documents MS are caused to pass through right on the fixed first-surface reading unit 151 of the scanner 150 immediately after being inverted. In this case, images of the first surfaces of the documents MS are read by the fixed first-surface reading unit 151 of the scanner 150.

Figure 5:
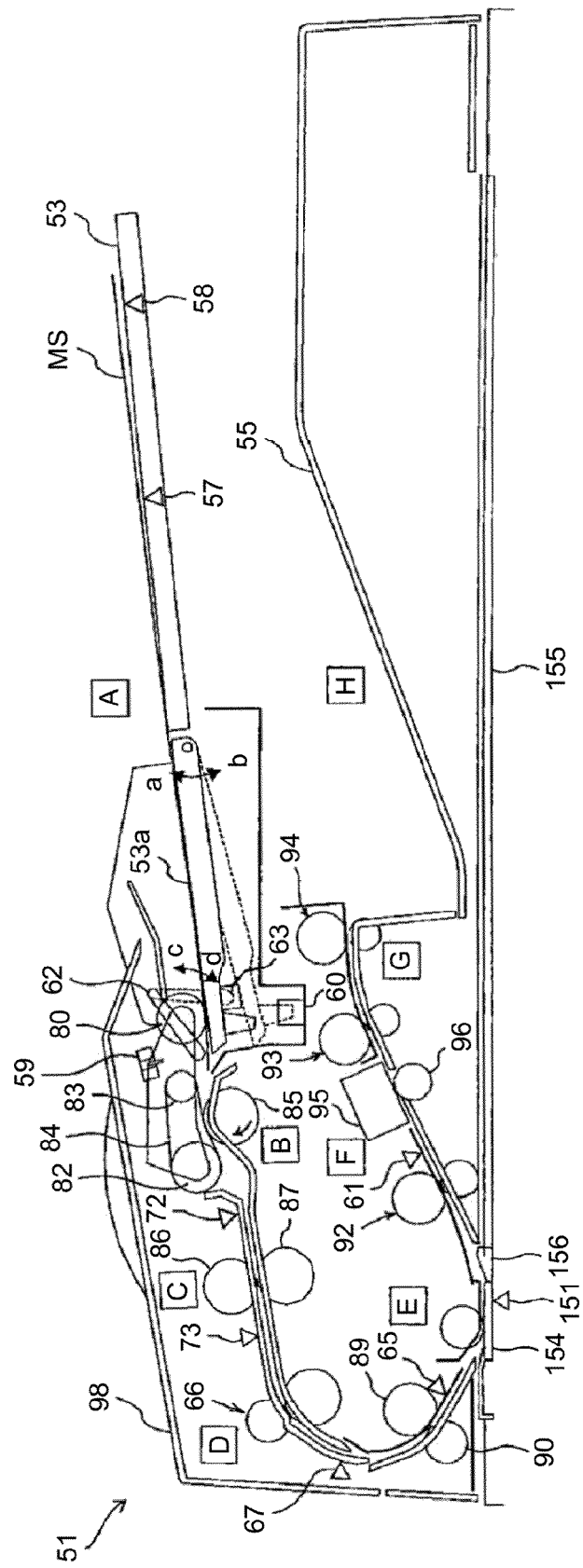
FIG. 5 is an enlarged configuration view illustrating the configuration of the substantial part of the ADF as well as the upper part of the scanner.
Figure 6:
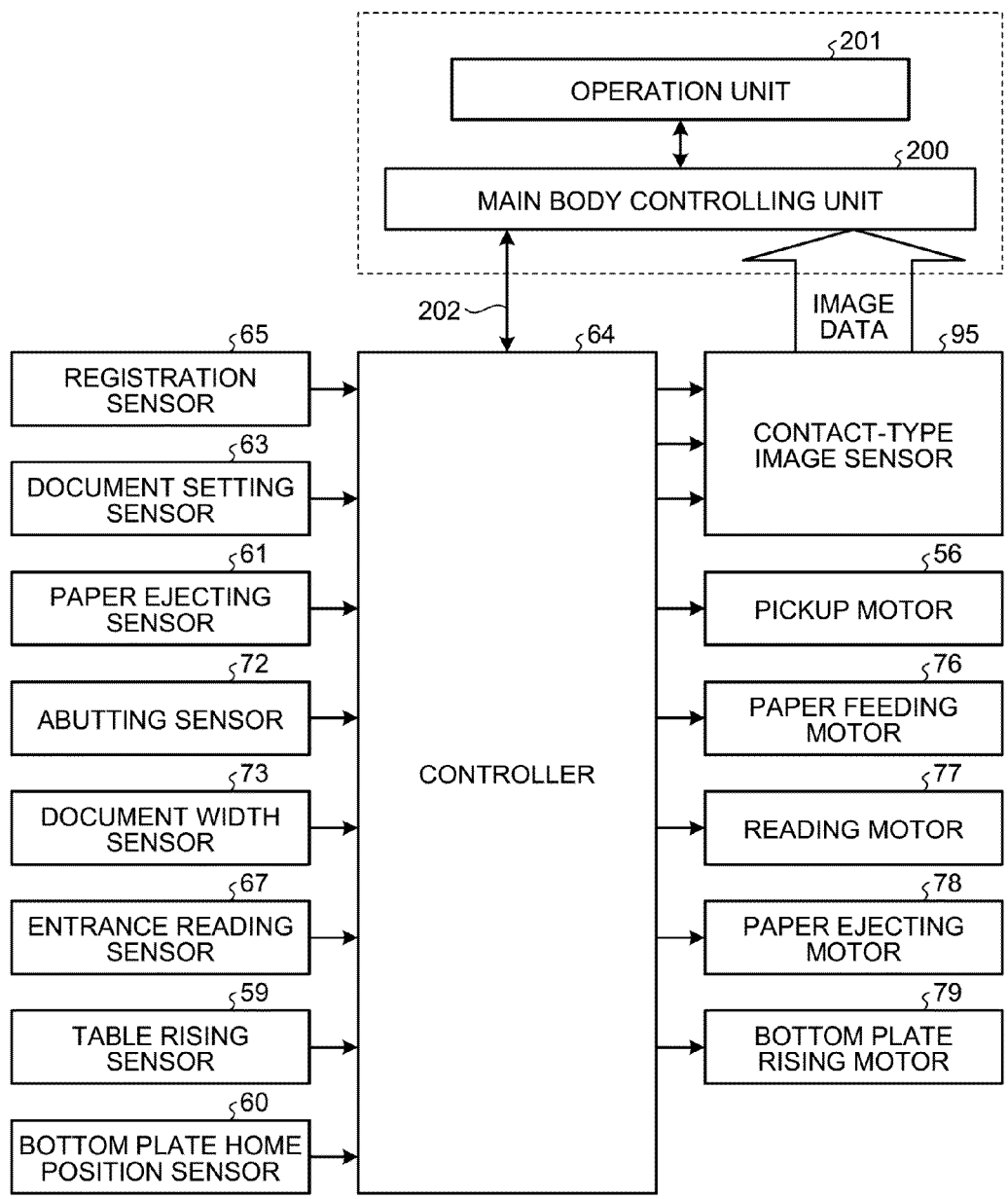
FIG. 6 is a block diagram illustrating a part of the electric circuit of the copier.

FIG. 5 is an enlarged configuration view illustrating the configuration of the substantial part of the ADF 51 as well as the upper part of the scanner 150. FIG. 6 is a block diagram illustrating a part of the electric circuit of the ADF 51 and the scanner 150. The ADF 51 includes a document setting part A, a separating and feeding part B, a registration part C, a turning part D, a first reading and conveying part E, a second reading and conveying part F, a paper ejecting part G, a stacking part H, and the like.

As illustrated in FIG. 6, the ADF 51 includes a controller 64 composed of an ASIC (Application Specific Integrated Circuit) and the like, and various equipment and sensors can be controlled by the controller 64. A registration sensor 65, a document setting sensor 63, a paper ejecting sensor 61, an abutting sensor 72, a document width sensor 73, an entrance reading sensor 67, a table rising sensor 59, and the like are connected to the controller 64. In addition, a contact type image sensor 95, a pickup motor 56, a paper feeding motor 76, a reading motor 77, a paper ejecting motor 78, a bottom plate rising motor 79, and the like are connected. Moreover, a main body controlling unit 200 that manages the control of the various equipment of the scanner, and the like are connected. The scanner 150 includes the main body controlling unit 200 composed of a CPU (Central Processing Unit) (not illustrated), a RAM (Random Access Memory) (not illustrated), and the like. Thus, the various equipment and the sensors (not illustrated) inside the scanner 150 can be controlled. In addition, the main body controlling unit 200 is connected to the controller 64 of the ADF 51 by an I/F 202 and can indirectly control the various equipment and the sensors inside the ADF 51 via the controller 64.

In FIG. 5, the document setting part A includes the document setting board 53 on which a bundle of documents MS is set, and the like. The separating and feeding part B separates and feeds the set bundle of documents MS one by one. The registration part C temporarily comes in contact with the fed documents MS for alignment and delivers the aligned documents MS. The turning part D includes a curved conveying section curved like a C-shape and inverts the top and the bottom of the documents MS while turning up the documents MS inside the curved conveying section. The first reading and conveying part E causes the fixed first-surface reading unit 151 disposed inside the scanner (not illustrated) to read the first surfaces of the documents MS under the first contact glass 154 while conveying the documents MS on the first contact glass 154. The second reading and conveying part F causes the contact type image sensor 95 to read the second surfaces of the documents MS while conveying the documents MS under the contact type image sensor 95. The paper ejecting part G ejects the documents MS with the images on the both sides thereof have been read toward the stacking part H. The stacking part H stacks the documents MS on the stacking board 55.

The documents MS are set in a state in which the leading ends thereof are placed on a movable document table 53*a* swingable in directions as indicated by arrows a and b in FIG. 5 according to the thickness of the bundle of documents MS and the trailing ends thereof are placed on the document setting board 53. At this time, side guides (not illustrated) are caused to contact both ends of the documents MS in the width direction thereof (direction orthogonal to the space of FIG. 5) to adjust the position of the documents MS in the width direction thereof. The documents MS thus set press up a lever member 62 disposed so as to be swingable over the movable document table 53*a*. Accordingly, the document setting sensor 63 detects the setting of the documents MS and sends a detection signal to the controller 64. The detection signal is sent from the controller 64 to the main body controlling unit 200 via the I/F 202.

The document setting board 53 retains a first length sensor 57 and a second length sensor 58 each composed of a reflection type photosensor or an actuator type sensor that detects the length of the documents MS in the conveying direction thereof. The length of the documents MS in the conveying direction thereof is detected by these length sensors.

Over the bundle of documents MS set on the movable document table 53*a*, a pickup roller 80 supported by a cam mechanism so as to be vertically movable (directions as indicated by arrows c and d in FIG. 5) is disposed. The cam mechanism is capable of vertically moving the pickup roller 80 when driven by the pickup motor 56. As the pickup roller 80 rises, the movable document table 53*a* swings in the direction as indicated by arrow a in FIG. 5 to cause the pickup roller 80 to come in contact with the top one of the bundle of documents MS. As the movable document table 53*a* further rises, the table rising detecting sensor 59 detects that the movable document table 53*a* has risen to its upper limit. Thus, as the pickup motor 56 stops, the movable document table 53*a* stops rising.

On a main body operation unit 201 provided in the main body of the copier and composed of a numeric keypad, a display, and the like, an operator performs a key operation to set a reading mode requesting a double-side reading mode or a single-side reading mode, an operation to press the copy starting key, and the like. In other words, the main body operation unit 201 functions as a mode information acquiring unit for acquiring information on which of the double-side reading mode and the single-side reading mode is to be put into force. When the copy starting key is pressed, a document feeding signal is sent from the main body controlling unit 200 to the controller 64 of the ADF 51 via the I/F 202. As a result, the pickup roller 80 is driven to rotate by the normal rotation of the paper feeding motor 76 and delivers the documents MS on the movable document table 53*a* from the movable document table 53*a*.

On the setting of the double-side reading mode or the single-side reading mode, it is possible to collectively set the double-side reading mode or the single-side reading mode to all the documents MS set on the movable document table 53*a*. In addition, it is possible to separately set the reading modes to each of the documents MS. For example, it is possible to set the double-side reading mode to the first and 10th documents MS and set the single-side reading mode to the other documents MS.

The documents MS delivered by the pickup roller 80 go to the separating and conveying part B and move to a position at which the documents MS come in contact with a paper feeding belt 84. The paper feeding belt 84 is stretched by a driving roller 82 and a driven roller 83 and caused to endlessly move clockwise in FIG. 5 by the rotation of the driving roller 82 accompanied by the normal rotation of the paper feeding motor 76. A reverse roller 85 driven to rotate clockwise in FIG. 5 by the normal rotation of the paper feeding motor 76 comes in contact with the lower stretched surface of the paper feeding belt 84. At the contact position, the surface of the paper feeding belt 84 moves in the paper feeding direction. Conversely, when coming in contact with the paper feeding belt 84 at prescribed pressure directly or with only one document MS held therebetween, the reverse roller 85 rotates with the belt or the document MS. However, when the plurality of documents MS is held at the contact position, the rotating force is smaller than the torque of a torque limiter. Therefore, the reverse roller 85 is driven to rotate clockwise in FIG. 5, i.e., in a direction opposite to the rotating direction. Thus, a moving force is applied by the reverse roller 85 to the documents MS lower in position than the top document MS in the direction opposite to the paper feeding direction, whereby only the top one of the documents MS is separated.

The document MS singly separated by the operation of the paper feeding belt 84 and the reverse roller 85 goes to the registration part C. The leading end of the document MS is detected when the document MS passes through right under the abutting sensor 72. At this time, the pickup roller 80 receiving the driving force of the pickup motor 56 is still driven to rotate. However, since the pickup roller 80 is separated from the document MS by the downward movement of the movable document table 53*a*, the document MS is conveyed only by the endless moving force of the paper feeding belt 84. Then, the endless movement of the paper feeding belt 84 is continued for a prescribed period of time after a timing at which the leading end of the document MS is detected by the contact sensor 72. Subsequently, the leading end of the document MS abuts on the contact position between a pull-out driving roller 86 and a pull-out driven roller 87 driven to rotate while coming in contact with the pull-out driving roller 86. The trailing end of the document MS is delivered toward the paper feeding direction with the leading end thereof contacting the contact position between both rollers. As a result, the leading end is positioned at the contact position in a state in which the document MS is bent by a prescribed amount. Thus, the skew (inclination) of the document MS is corrected, and the document MS takes a posture lying along the paper feeding direction.

The pull-out driven roller 87 plays a role in, besides correcting the skew of the document MS, conveying the document MS with the skew corrected to a pair of intermediate rollers 66 on the downstream side in the conveying direction of the document, and is driven to rotate by the reverse rotation of the paper feeding motor 76. As the paper feeding motor 76 reversely rotates, the pull-out driven roller 87 and one of the pair of intermediate rollers 66 coming in contact with each other start rotating and the endless movement of the paper feeding belt 84 stops. In addition, the rotation of the pickup roller 80 stops at this time.

The document MS delivered from the pull-out driven roller 87 passes through right under the document width sensor 73. The document width sensor 73 includes a plurality of paper detectors each composed of a reflection type photosensor and the like, and the paper detectors are arranged side by side in the width direction of the document (direction orthogonal to the space of FIG. 5). The size of the document MS in the width direction thereof is detected based on which of the paper detectors detects the document MS. In addition, the length of the document MS in the conveying direction thereof is detected based on a timing at which the abutting sensor 72 stops detecting the trailing end of the document MS after the abutting sensor 72 detects the leading end thereof.

The leading end of the document MS with the size in the width direction thereof detected by the document width sensor 73 goes to the turning part D and is held by the contact position between the pair of intermediate rollers 66. The conveying speed of the document MS by the pair of intermediate rollers 66 is set to be faster than that of the document MS by the first reading and conveying part E that will be described later. Thus, time for delivering the document MS to the first reading and conveying part E is reduced.

The leading end of the document MS conveyed inside the turning part D passes through a position opposed to the entrance reading sensor 67. Thus, when the leading end of the document MS is detected by the entrance reading sensor 67, the conveying speed of the document by the pair of intermediate rollers 66 is reduced until the leading end is conveyed to the position of the pair of the entrance reading rollers 89 and 90 on the downstream side in the conveying direction. In addition, as the reading motor 77 is driven to start rotating, one of the pair of entrance reading rollers 89 and 90, one of a pair of exit reading rollers 92, and one of a pair of second exit reading rollers 93 are each driven to start rotating.

Inside the turning part D, the upper and the lower surfaces of the document MS are inverted while being conveyed in the curved conveying path between the pair of intermediate rollers 66 and the pair of entrance reading rollers 89 and 90, and the conveying direction is turned up. Then, the leading end of the document MS having passed through the nip between the pair of entrance reading rollers 89 and 90 passes through right under the registration sensor 65. At this time, when the leading end of the document MS is detected by the registration sensor 65, the conveying speed of the document is reduced over a prescribed conveying distance, and the conveyance of the document MS is temporarily stopped in front of the first reading and conveying part E. In addition, a temporary stopping signal is sent to the main body controlling unit 200 via the I/F 202.

When the main body controlling unit 200 having received the temporary stopping signal sends a read starting signal, the rotation of the reading motor 77 is resumed and the conveying speed of the document MS is increased up to a prescribed conveying speed by the control of the controller 64 until the leading end of the document MS reaches the inside of the first reading and conveying part E. Then, at a timing at which the leading end of the document MS reaches the reading position of the fixed first-surface reading unit 151, a gate signal indicating the effective image region of the first surface of the document MS in the sub-scanning direction thereof is sent from the controller 64 to the main body controlling unit 200. The sending of the signal is continued until the trailing end of the document MS passes through the reading position by the fixed first-surface reading unit 151, and the first surface of the document MS is read by the fixed first-surface reading unit 151. Note that the timing at which the leading end of the document MS reaches the reading position by the fixed first-surface reading unit 151 is calculated based on the pulse count of the reading motor 77.

After passing through the first reading and conveying part E, the leading end of the document MS is detected by the paper ejecting sensor 61 by way of the pair of exit reading rollers 92 that will be described later. If the single-side reading mode is set, the second surface of the document MS may not be read by the contact type image sensor 95 that will be described later. When the leading end of the document MS is detected by the paper ejecting sensor 61, the paper ejecting motor 78 starts driving normally and a lower one of a pair of paper ejecting rollers 94 in FIG. 5 is driven to rotate clockwise. In addition, based on the pulse count of the paper ejecting motor after the detection of the leading end of the document MS by the paper ejecting sensor 61, a timing at which the trailing end of the document MS passes through the nip of the pair of paper ejecting rollers 94 is calculated. Further, based on the calculation result, the driving speed of the paper ejecting motor 78 is reduced right before the trailing end of the document MS passes through the nip of the pair of paper ejecting rollers 94. As a result, the document MS is ejected at a speed at which the document MS does not jump out of the stacking board 55.

On the other hand, if the double-side reading mode is set, a timing at which the leading end of the document MS reaches the contact type image sensor 95 after being detected by the paper ejecting sensor 61 is calculated based on the pulse count of the reading motor 77. At this timing, a gate signal indicating the effective image region of the second surface of the document MS in the sub-scanning direction thereof is sent from the controller 64 to the main body controlling unit 200. The sending of the signal is continued until the trailing end of the document MS passes through the reading position of the contact type image sensor 95, and the second surface of the document MS is read by the contact type image sensor 95.

The reading surface of the contact type image sensor 95 (CIS) serving as a second-surface reading unit is subjected to a coating process to prevent reading vertical streaks from occurring when glue-like foreign matter attached to the document MS is transferred onto the reading surface. At a position opposed to the contact type image sensor 95, a second reading roller 96 serving as a document supporting unit for supporting the document MS from the non-reading surface side (the first-surface side) is disposed. The second reading roller 96 plays a role in functioning as a reference white section that acquires shading data in the contact type image sensor 95, besides preventing the document MS from floating at the reading position of the contact type image sensor 95. In the copier, the second reading roller 96 is used as the document supporting unit for supporting the document MS at the position opposed to the contact type image sensor 95, but a guide plate type may be used instead.

Figure 7:
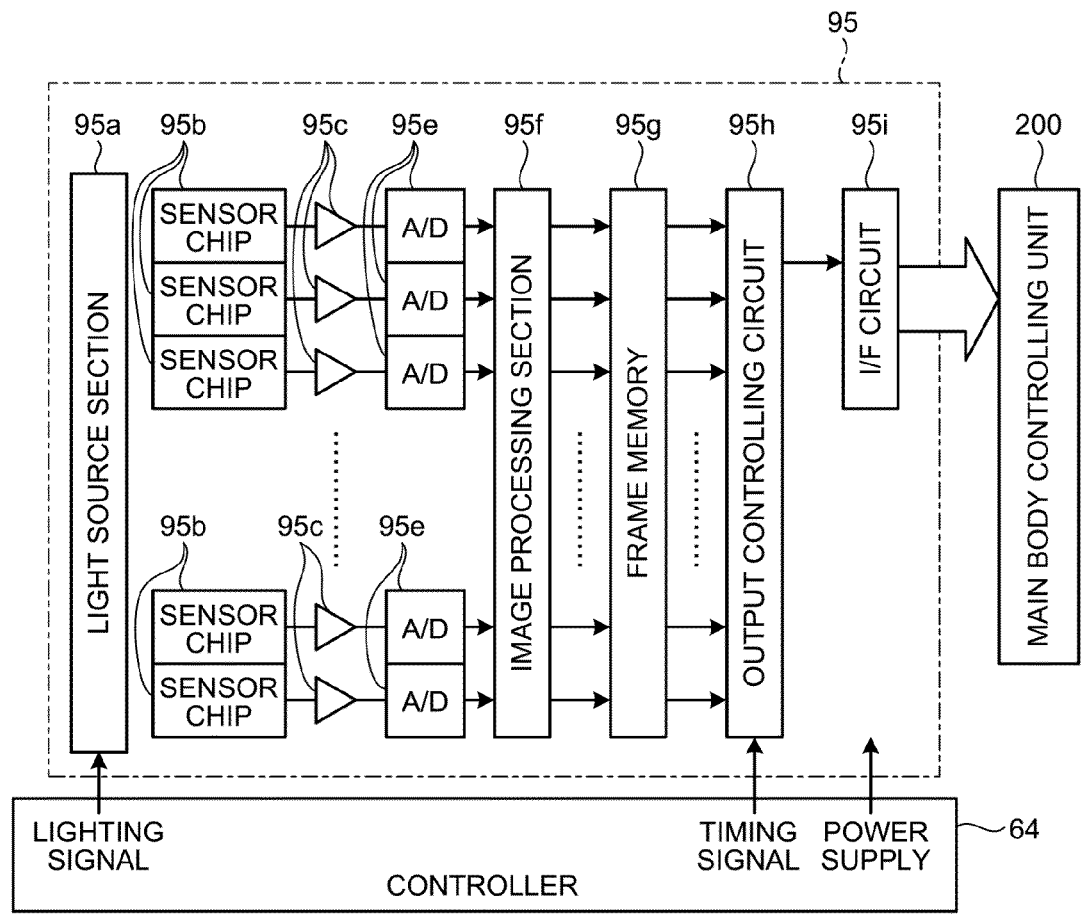
FIG. 7 is a block diagram illustrating the substantial part of the electric circuit of a contact type image sensor.

FIG. 7 is a block diagram illustrating the substantial part of the electric circuit of the contact type image sensor 95. As illustrated in FIG. 7, the contact type image sensor 95 includes a light source section 95a composed of an LED array, a fluorescent lamp, a cold-cathode tube, or the like. In addition, the contact type image sensor 95 includes a plurality of sensor chips 95b arranged in a main-scanning direction (direction corresponding to the width direction of the document). Moreover, the contact type image sensor 95 includes a plurality of OP amplification circuits 95c connected to the sensor chips 95b, respectively. Furthermore, the contact type image sensor 95 includes a plurality of A/D converters 95e connected to the OP amplification circuits 95c, respectively. Furthermore, the contact type image sensor 95 includes an image processing section 95f, a frame memory 95g, an output controlling circuit 95h, an I/F circuit 95i, and the like.

The sensor chips 95b include a photoelectric converting element called a non-magnification contact image sensor and a condensing lens. Before the document (not illustrated) goes to the reading position of the contact type image sensor 95, a lighting-ON signal is sent from the controller 64 to the light source section 95a. Thus, the light source section 95a lights up, and the light falls on the second surface of the document (not illustrated). In the plurality of sensor chips 95b, the light reflected at the second surface of the document is condensed onto the photoelectric converting element by the condensing lens and read as image information. The image information read by each of the sensor chips 95b is amplified by the OP amplification circuit 95c and then converted into digital image information by the A/D converter 95e. The digital image information is input to the image processing section 95f to be subjected to shading correction or the like, and then temporarily stored in the frame memory 95g. Afterwards, the digital image information is converted by the output controlling circuit 95h into a data form receivable by the main body controlling unit 200 and then output to the main body controlling unit 200 via the I/F circuit 95i. Note that the controller 64 outputs a timing signal for indicating the timing at which the leading end of the document reaches the reading position of the contact type image sensor 95 (image data after the timing is treated as effective data), the lighting signal of the light source, the power supply, and the like.

Next, the characteristic configuration of the copier will be described.

Figure 8:
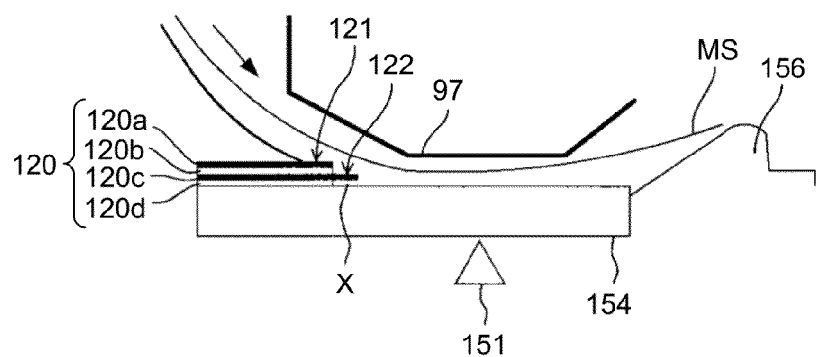
FIG. 8 is an enlarged configuration view illustrating the periphery of a fixed first-surface reading unit of an image reading apparatus.

FIG. 8 is an enlarged configuration view illustrating the periphery of the fixed first-surface reading unit 151 of the document reading apparatus 50.

As illustrated in FIG. 8, a step member 120 is provided upstream of the fixed first-surface reading unit 151 in the conveying direction of the document. The step member 120 includes a first document guiding portion 121 for conveying the document with a prescribed distance from a first contact glass 154 serving as a transmitting glass at the image reading position of the fixed first-surface reading unit 151. In addition, the step member 120 includes a second document guiding portion 122 that contacts the trailing end of the document having passed through the first document guiding portion 121 and serves as a protrusion elastically deformed by the stiffness of the document. The step member 120 has a four-layer structure. In other words, the step member 120 includes a first layer composed of an adhesive layer 120d that adheres a film-like second sheet member 120c forming the second document guiding portion 122 and made of a resin such as PET to the first contact glass 154, and includes a second layer composed of the second sheet member 120c. In addition, a third layer is an adhesive layer that adheres a film-like first sheet member 120a forming the first document guiding portion 121 to the second sheet member 120b, and a fourth layer is composed of the first sheet member 120a. The second sheet member 120c protrudes downstream of the adhesive layers 120d and 120b and the first sheet member 120a in the conveying direction of the document, and the resulting protrusion serves as the second document guiding portion 122. Therefore, space X is formed between the second document guiding portion 122 and the first contact glass 154, and the second document guiding portion 122 is in a state of being supported in a cantilever fashion. With this configuration, the second document guiding portion 122 can be made elastically deformable.

A height from the first contact glass 154 to the first document guiding portion 121 is set at about 0.5 mm. If the height from the first contact glass 154 to the first document guiding portion 121 is too low, the document may contact the first contact glass 154 at the reading position. On the other hand, if the height from the first contact glass 154 to the first document guiding portion 121 is too high, the document is too away from the first contact glass 154 at the reading position, which results in an image of the document being out of focus.

The second sheet member 120c forming the second document guiding portion 122 is colored in black. A part of the light emitted from the light source (not illustrated) of the fixed first-surface reading unit falls on the rear surface (surface opposed to the first contact glass 154) of the second document guiding portion 122. Since the second sheet member 120c is colored in black, the light falling on the rear surface of the second document guiding portion 122 is absorbed. As a result, the influence of the light reflected at the rear surface of the second document guiding portion 122 can be eliminated, and an image of the document can be read satisfactorily. In the embodiment, the second sheet member 120c is colored in black, but at least only the surface of the second sheet member 120c opposed to the first contact glass 154 may be colored in black.

Figure 9A:
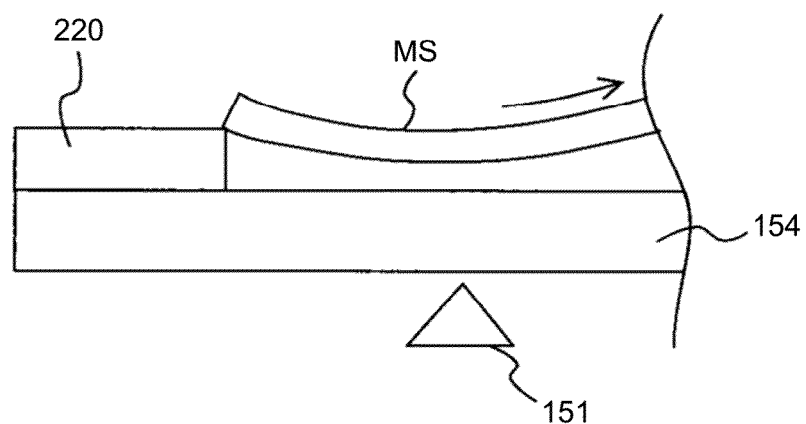
FIGS. 9A and 9B are views illustrating the state of document conveyance with a conventional step member.
Figure 9B:
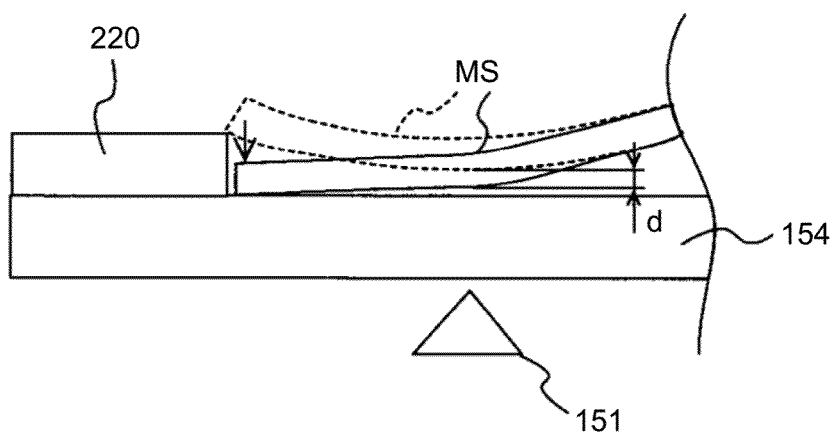

FIGS. 9A and 9B are views illustrating the state of document conveyance with a conventional step member 220.

As illustrated in FIG. 9A, the document MS moves with a prescribed distance from the first contact glass 154 while being conveyed in contact with the step member 220. Thus, foreign matter such as glue and correction fluid attached to the document can be prevented from being transferred onto the first contact glass at the reading position thereof, and vertical streaks can be prevented from occurring in a read image.

As illustrated in FIG. 9B, after having passed through the step member 220, the trailing end of the document moves toward the first contact glass 154 and contacts the first contact glass 154 due to the stiffness of the document. As a result, the document MS moves closer to the first contact glass 154 at the reading position right after the trailing end of the document has passed through the step member 220. As illustrated in FIG. 9B, compared with a state in which the trailing end of the document has not passed through the step member 220, the document MS moves closer to the first contact glass 154 by distance d when the trailing end of the document has passed through the step member 220. As described above, a great change occurs in the distance between the document MS and the fixed first-surface reading unit 151 before and after the trailing end of the document MS has passed through the step member 220. If an image of the document is positioned closer to the fixed first-surface fixing unit 151, the image is read in a greater size. Accordingly, with a great change in the distance between the document MS and the fixed first-surface reading unit 151 before and after the trailing end of the document MS passes through the step member 220, the size of the read image is suddenly changed at a certain point of the trailing end of the image. As described above, if the size of the read image is suddenly changed at the certain point of the trailing end of the image, a difference in the size of the image becomes conspicuous.

Figure 10A:
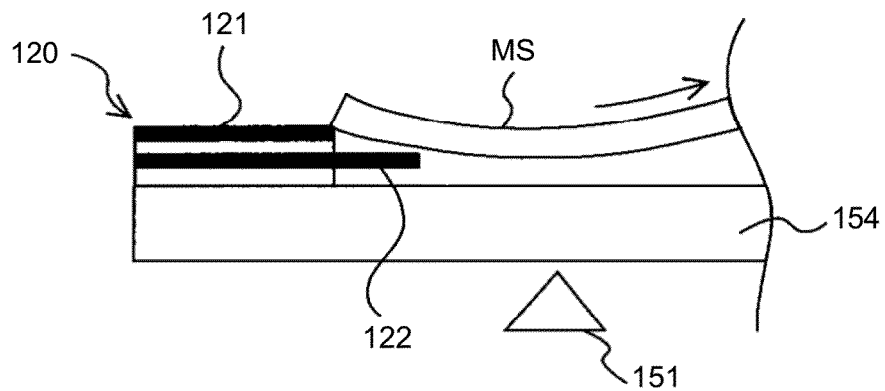
FIGS. 10A to 10C are views illustrating the state of document conveyance with a step member according to the embodiment.
Figure 10B:
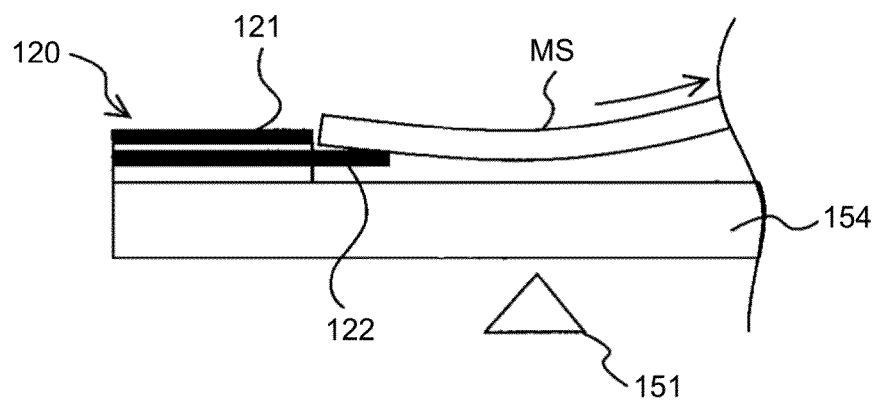
Figure 10C:
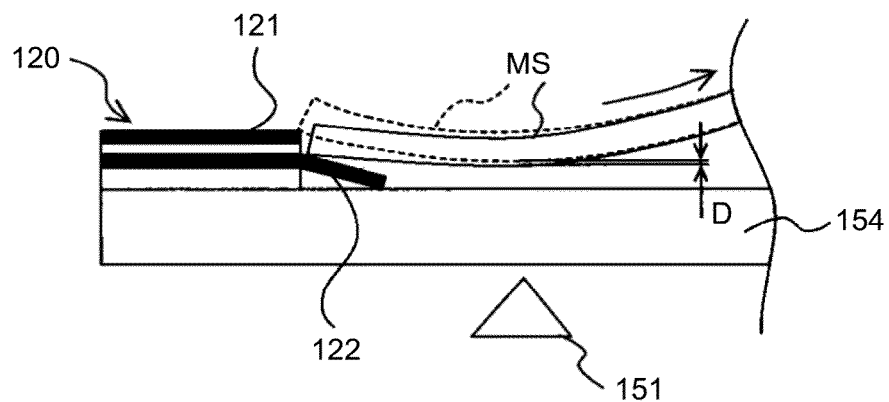

FIGS. 10A to 10C are views illustrating the state of document conveyance with the step member 120 according to the embodiment.

As illustrated in FIG. 10A, the document MS is conveyed in contact with the first document guiding portion 121 of the step member 120. Since the document MS is conveyed in contact with the first document guiding portion 121, it is conveyed without contacting the first contact glass 154 at the reading position. Thus, foreign matter attached to the document MS can be prevented from being transferred onto the first contact glass 154.

As illustrated in FIG. 10B, when the trailing end of the document has passed through the first document guiding portion 121, the vicinity of the trailing end of the document contacts the second document guiding portion 122 made elastically deformable. Then, the second document guiding portion 122 receives a force for moving the trailing end of the document to the first contact glass 154 due to the stiffness of the document. As a result, as illustrated in FIG. 10C, the elastically-deformable second document guiding portion 122 is elastically deformed toward the first contact glass. Thus, the document-contacting surface of the second document guiding portion 122 is made into an inclined surface that gradually gets closer to the first contact glass 154 toward the downstream side in the conveying direction of the document. Accordingly, the trailing end of the document gradually moves toward the first contact glass 154 as being guided by the inclined surface of the second document guiding portion 122. Then, after having passed through the second document guiding portion 122, the trailing end of the document is conveyed in contact with the first contact glass 154 due to the stiffness of the document.

As illustrated in FIG. 10C, in the embodiment, the document MS moves closer to the first contact glass 154 only by small distance D at the reading position before and after the trailing end of the document passes through the first document guiding portion 121. Therefore, a change in the size of a read image before and after the trailing end of the document passes through the first document guiding portion 121 is very small. Then, since the trailing end of the document gradually moves closer to the first contact glass 154 as being guided by the second document guiding portion 122, the document gradually moves closer to the fixed first-surface reading unit 151 at the reading position. As a result, the read image becomes gradually greater in size toward the trailing end. However, since the size of the read image is gradually changed, the change in the image can be made inconspicuous compared with a case in which the size of the read image is suddenly changed.

In addition, in the embodiment, only with the protrusion of the second sheet member 120c downstream of the adhesive layers 120b and 120d and the first sheet member 120a in the conveying direction of the document, the second document guiding portion 122 of the step member 120, which is a downstream part of the step member 120 in the conveying direction of the document, can be configured to be elastically deformable. Moreover, even if the second sheet member 120c protrudes excessively and the document contacts the second document guiding portion 122 while being conveyed in contact with the first document guiding portion 121, the second document guiding portion 122 is elastically deformed. Thus, even if the document contacts the second document guiding portion 122 when being conveyed in contact with the first document guiding portion 121, the conveying path of the document is not greatly changed. As a result, since the document is prevented from being out of the depth of field (focused range) of the fixed first-surface reading unit 151 at the reading position, the image can be read satisfactorily. As described above, the second sheet member 120c can be roughly adhered to the first contact glass 154, and thus the step member 120 can be easily formed.

For example, if the plurality of sheet members is superimposed one on another such that the plurality of sheet members deviate from one another to form steps at the whole of the downstream part of the step member in the conveying direction of the document as illustrated in FIG. 5 in Japanese Patent Application Laid-open No. 2004-260246, the trailing end of the document can be configured to gradually move closer to the first contact glass 154. In this case, however, if the sheet members are thick or the adhesive layers are too thick, the steps of the downstream part of the step-like portion in the conveying direction of the document become large. As a result, since the document falls from a high position, the problem in which the size of an image is suddenly changed cannot be sufficiently prevented.

In addition, it may be possible that the step member is made of an elastic member such as rubber and a sponge and the downstream part of the elastic member in the conveying direction of the document is elastically deformed by the stiffness of the document to incline the step member on the downstream side in the conveying direction of the document. In this case, however, since the downstream part of the step member in the conveying direction of the document is in contact with the contact glass, the elastic deformation of the elastic member by the stiffness of the document is compressive deformation. Due to the compressive deformation, the deformation of the elastic member is limited. Even if the elastic member is made of a member that is easily elastically deformed, the elastic force of the elastic member cannot be sufficiently exerted, which results in that a certain height from the first contact glass remains. As a result, the problem in which the trailing end of the document falls on the first contact glass 154 from a certain height to cause a sudden change in the size of an image cannot be sufficiently solved.

On the other hand, in the embodiment, the second document guiding portion 122 (second sheet member 120c) protrudes downstream of the adhesive layers 120b and 120d and the first sheet member 120a in the conveying direction of the document by the distance X to provide the distance between the second document guiding portion 122 and the first contact glass 154. In this way, the second document guiding portion 122 has a cantilever-like structure, and thus the elastic deformation of the second document guiding portion 122 by the stiffness of the document is bending deformation. Therefore, even if there is a certain height from the second document guiding portion 122 to the first contact glass 154, the guiding portion is bent according to the stiffness of the document such that the trailing end of the document can gradually move closer to the first contact glass 154. Accordingly, the adhesive layer 120d adhered to the first contact glass 154 can be made thick, and the step member 120 can be firmly adhered to the first contact glass 154. In addition, compared with the configuration in which the whole step member is formed into a step-like shape, the number of the sheet members can be reduced.

In addition, in the embodiment, the second document guiding portion 122 (second sheet member 120c) protrudes downstream of the adhesive layers 120b and 120d and the first sheet member 120a in the conveying direction of the document by the distance X, and the thin second sheet member 120c is bent according to the stiffness of the document to form the inclination. At this time, the leading end of the second document guiding portion 122 contacts the first contact glass 154 as the second document guiding portion 122 is bent. As a result, a height from the first contact glass 154 to the leading end of the document guiding surface of the second sheet member 120c after the second sheet member 120c is bent and contacts the first contact glass can be made equal to the thickness of the second sheet member 120c. Accordingly, compared with a case in which the step member is compressively deformed, a height at which the trailing end of the document falls from the step member can be securely lowered. Therefore, the problem in which the trailing end of the document falls to cause a sudden change in the size of an image can be sufficiently solved.

Note that if the protruding second sheet member 120c itself is made of an elastic member such as a thin PET resin sheet, it can be further elastically deformed by the stiffness of the document. Therefore, a greater effect can be produced.

Figure 11A:
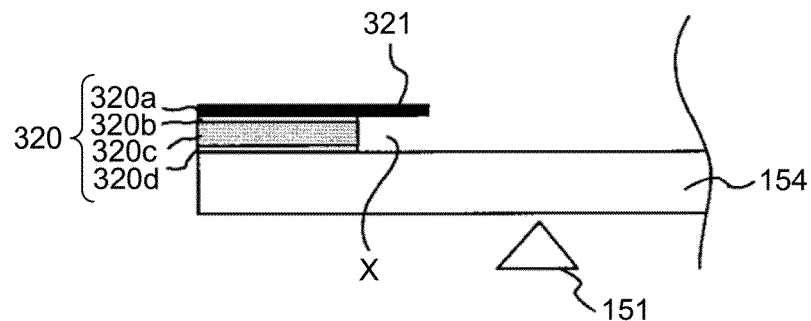
FIGS. 11A to 11C are views illustrating a step member according to a modified example.
Figure 11B:
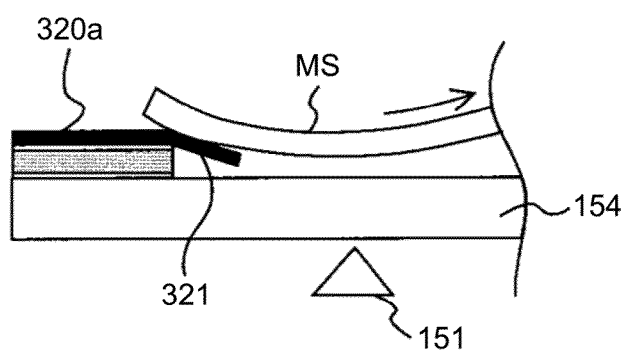
Figure 11C:
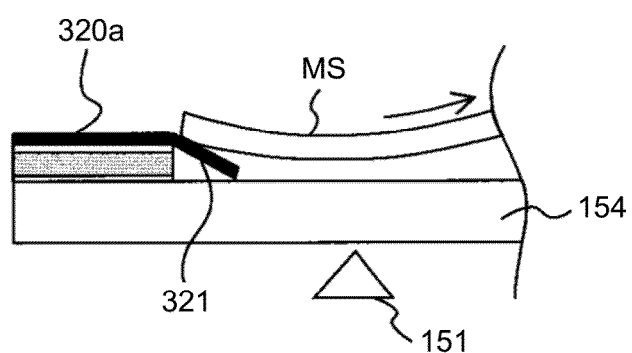

FIGS. 11A to 11C are views illustrating a step member 320 according to a modified example.

As illustrated in FIGS. 11A to 11C, in the step member 320 according to the modified example, a sheet member 320a is fixed onto a base member 320c by an adhesive 320b, the base member 320c being fixed onto the first contact glass 154 by an adhesive 320d. Further, the sheet member 320a protrudes downstream of the other members in the conveying direction of the document to form a protrusion 321. Also in the modified example, the sheet member 320a is colored in black, and the light from the light source (not illustrated) of the fixed first-surface reading unit 151 can be absorbed in the rear surface of the portion protruding downstream. Accordingly, the influence of the light reflected at the rear surface of the first sheet member 320a on a read image can be eliminated.

As illustrated in FIG. 11B, before the trailing end of the document reaches the step member 320, the document is conveyed in contact with the downstream end of the non-elastic portion of the step member 320 in the conveying direction of the document. Thus, the document can be conveyed in non-contact with the first contact glass 154 at the reading position, and foreign matter attached to the document can be prevented from being transferred onto the first contact glass 154 at the reading position thereof. In addition, at this time, the protrusion 321 of the step member 320 located downstream in the conveying direction of the document is elastically deformed along the conveying path of the document.

Then, as illustrated in FIG. 11C, when the trailing end of the document contacts the protrusion 321 of the step member 320, the protrusion 321 is elastically deformed toward the first contact glass 154 by the stiffness of the document as in the embodiment. Thus, as in the embodiment, the protrusion 321 is formed to have an inclined surface that gradually gets closer to the first contact glass 154 toward the downstream side in the conveying direction of the document. As a result, the trailing end of the document is conveyed so as to gradually move closer to the first contact glass 154 by virtue of the inclined surface. Thus, as in the embodiment, a change in the size of a read image at the trailing end thereof can be made inconspicuous.

Also in the modified example, only by making the sheet member 320a protrude downstream of the adhesive layers 320b and 320d and the base member 320c in the conveying direction of the document, the downstream part in the conveying direction of the document can be configured to be elastically deformable. Accordingly, the inclined surface that gradually guides the trailing end of the document to the first contact glass can be easily formed.

In addition, the modified example of FIGS. 11A to 11C is particularly desirable for a document having a large thickness. This is because it is difficult for the sheet member 321 to follow a document having a small thickness due to the less stiffness of the document compared with the document having a large thickness and thus the substantial elastic deformation of the sheet member 321 cannot be expected. Therefore, for the document having a small thickness, a configuration in which the step is provided upstream of the protrusion of the elastic member as illustrated in FIGS. 10A to 10C is desirable since the document falls gradually. Note that in the configuration of FIGS. 10A to 10C, the first document guiding portion 121 the second document guiding portion 122 forms a step at upstream of the second document guiding portion 122 serving as the protrusion. When the leading end of the document moves from the first document guiding portion 121 to the second document guiding portion 122 and gets on the second document guiding portion 122, the second document guiding portion 122 is bent and inclined toward the first contact glass 154. At this time, since the document obliquely moves in a straight line toward the first contact glass 154 as its whole track, the trailing end of the document smoothly falls. Therefore, no problem is caused by providing the step. In addition, the first document guiding portion 121 itself is further desirably made into a protrusion (i.e., a configuration like a cantilever) like the second document guiding portion 122.

Moreover, in the modified example of FIGS. 11A to 11C, it may be possible to use, as the sheet member, a thinner sheet member or a sheet member having less rigidity and increase the protruding amount of the sheet member compared with the configuration illustrated in FIGS. 10A to 10C so that the protrusion 321 is easily elastically deformed.

The matter described above is only an example, and the present invention produces a unique effect for each of the aspects described below.

(Aspect 1)

In an image reading apparatus including, upstream of a reading position, at which an image of a conveyed document is read by a reading unit such as a fixed first-surface reading unit 151 via a transmitting glass such as a first contact glass 154, in a conveying direction of the document, a step member 120 that has a document guiding surface at a position away from a surface of the transmitting glass by a prescribed distance and forms a step between the document guiding surface and the transmitting glass, the step member is provided with a protrusion protruding downstream in the conveying direction of the document to form space between the transmitting glass and a downstream part of the step member 120 in the conveying direction of the document.

With this configuration, the protrusion is elastically deformed by the stiffness of the document, i.e., by the rigidity of the document, whereby the trailing end of the document can be gradually guided to the transmitting glass such as the first contact glass 154 as described in the embodiment. In addition, with a simple configuration in which a sheet member protrudes, the trailing end of the document can be gradually guided to the transmitting glass.

(Aspect 2)

In addition, in (Aspect 1), the protrusion is made of an elastic member.

With this configuration, the protrusion can be elastically deformed by the stiffness of the document, i.e., by the rigidity of the document.

(Aspect 3)

Moreover, in (Aspect 2), the protrusion is formed in such a way that a member forming a protrusion 321 such as a sheet member 320a protrudes downstream of other members in the conveying direction of the document.

With this configuration, the protrusion can be easily formed as described in the embodiment.

(Aspect 4)

Furthermore, in (Aspect 2) or (Aspect 3), at least a surface of the protrusion 321 is colored in black, the surface being opposed to the transmitting glass such as the first contact glass 154.

With this configuration, the influence of light reflected at the protrusion 321 can be eliminated as described in the embodiment.

(Aspect 5)

In any one of (Aspect 1) to (Aspect 4), the step member 120 includes a first document guiding portion 121 that conveys the document with the prescribed distance from the transmitting glass such as the first contact glass 154 at the reading position and a second document guiding portion 122 that is positioned closer to the transmitting glass than the first document guiding portion 121, positioned downstream of the first document guiding portion 121 in the conveying direction of the document, and contacts a trailing end of the document passing through the first document guiding portion 121, and the second document guiding portion 122 serves as the protrusion.

With this configuration, the trailing end of the document can be gradually guided to the transmitting glass such as the first contact glass 154 as described in the embodiment.

(Aspect 6)

In an image forming apparatus that includes an image forming unit such as an image forming unit 1 that forms an image on a recording member and an image reading unit such as a document reading apparatus 50 that reads an image of a document while conveying the document and forms an image read by the image reading unit on the recording member by the image forming unit, the image reading apparatus according to any one of (Aspect 1) to (Aspect 5) is used as the image reading unit.

With this configuration, an image in which a change in the size of the image at the trailing end thereof is inconspicuous can be copied.

According to the embodiment, when a document on a step member receives a force to move toward a transmitting glass due to its stiffness, the downstream protrusion of the step member in the conveying direction of the document is elastically deformed to be made into an inclined surface that gets closer to the transmitting glass toward the downstream in the conveying direction of the document. Thus, the trailing end of the document can gradually move closer to the transmitting glass as being guided by the inclined surface. As a result, the size of a read image at the trailing end thereof gradually increases, which can make the degradation of the read image at the trailing end thereof inconspicuous compared with a case in which the size of the read image suddenly increases.

In addition, according to the embodiment, for example, only by the lamination of sheet members one on another and the adhesion of a top sheet member in such a way as to protrude downstream of other sheet members in the conveying direction of the document, the protrusion can be formed downstream of the step member in the conveying direction of the document. Thus, even if a height from the transmitting glass to the document conveying surface of the step member lies in a small range of about 0.5 mm, the inclined surface that guides the trailing end of the document so as to gradually move closer to the transmitting glass can be easily formed, and an apparatus can be manufactured at low cost.

Moreover, according to the embodiment, the protrusion is elastically deformed to bend by the stiffness of the document to form the inclined surface that guides the trailing end of the document so as to gradually move closer to the transmitting glass. Thus, a height from the end of the inclined surface to the transmitting glass after the elastic deformation can be made equal to the thickness of the protrusion. Accordingly, the height from the end of the inclined surface to the transmitting glass after the elastic deformation can be lowered compared with a case in which the step member is compressively elastically deformed by the stiffness of the document to form the inclined surface. Thus, the size of an image can be prevented from being suddenly increased, compared with the case in which the step member is compressed and elastically deformed by the stiffness of the document to form the inclined surface.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
a transmitting glass; and
a step member upstream of a reading position with respect to a conveying direction, the reading position being a position at which an image of a conveyed document is read by a reading unit via the transmitting glass in the conveying direction of the document, the step member having a document guiding surface at a position away from a surface of the transmitting glass by a distance and forming a step between the document guiding surface and the transmitting glass, wherein
the step member includes a protrusion protruding downstream in the conveying direction of the document to form a space between the transmitting glass and the conveyed document.

2. The image reading apparatus according to claim 1, wherein
the protrusion is an elastic member.

3. The image reading apparatus according to claim 1, wherein
the step member is a plurality of members laminated one on another, and
the protrusion is formed in such a way that a member forming the protrusion protrudes downstream of other members in the conveying direction of the document.

4. The image reading apparatus according to claim 1, wherein
at least a surface of the protrusion is colored in black, the surface being opposed to the transmitting glass.

5. The image reading apparatus according to claim 1, wherein
the step member includes,
a first document guiding portion configured to convey the document with the prescribed distance from the transmitting glass at the reading position; and
a second document guiding portion closer to the transmitting glass than the first document guiding portion and downstream of the first document guiding portion in the conveying direction of the document, and contacts a trailing end of the document passing through the first document guiding portion, and
the second document guiding portion serves as the protrusion.

6. The image forming apparatus of claim 1, wherein the step member includes at least first and second document guiding layers having different lengths.

7. The image forming apparatus of claim 1, wherein the document guiding surface includes a first guiding surface and a second guiding surface, the first guiding surface is farther from the transmitting glass than the second surface and substantially parallel to the transmitting glass.

8. The image forming apparatus of claim 7, wherein the second guiding surface is configured to contact the transmitting glass.

9. An image forming apparatus comprising:
- an image forming unit configured to form an image on a recording member; and
- an image reading unit configured to read an image of a document while conveying the document, wherein
- the image forming apparatus is configured to form an image read by the image reading unit on the recording member by the image forming unit; and
- a transmitting glass; and
- a step member upstream of a reading position with respect to a conveying direction, the reading position being a position at which an image of a conveyed document is read by the image reading unit via the transmitting glass in the conveying direction of the document, the step member having a document guiding surface at a position away from a surface of the transmitting glass by a distance and forming a step between the document guiding surface and the transmitting glass, and
- the step member includes a protrusion protruding downstream in the conveying direction of the document to form a space between the transmitting glass and the conveyed document.

10. An image forming apparatus comprising:
- a glass;
- a reader configured to read a document via the glass; and
- a step member configured to maintain an open space between the glass and the document.

11. The image forming apparatus of claim 10, wherein the step member includes at least first and second document guiding layers having different lengths.

12. The image forming apparatus of claim 10, wherein the step member includes a document guiding surface, the document guiding surface including a first guiding surface and a second guiding surface, the first guiding surface is farther from the glass than the second surface and substantially parallel to the glass.

13. The image forming apparatus of claim 12, wherein the second guiding surface is configured to contact the glass.

* * * * *